United States Patent
Batz et al.

(10) Patent No.: US 9,923,728 B2
(45) Date of Patent: *Mar. 20, 2018

(54) SYSTEM AND METHOD FOR ASSOCIATING AN END USER FOR BILLING IN A NETWORK ENVIRONMENT

(71) Applicant: Cisco Technology, Inc., San Jose, CA (US)

(72) Inventors: Robert M. Batz, Raleigh, NC (US); Walter G. Dixon, Fuquay Varina, NC (US); Robert A. Mackie, Cary, NC (US); Mark Albert, Cary, NC (US); Chris O'Rourke, San Jose, CA (US); Humberto M. Tavares, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,683

(22) Filed: Apr. 23, 2015

(65) Prior Publication Data

US 2015/0229483 A1   Aug. 13, 2015

Related U.S. Application Data

(63) Continuation of application No. 11/928,820, filed on Oct. 30, 2007, now Pat. No. 9,054,882.

(51) Int. Cl.
| H04L 12/28 | (2006.01) |
| H04L 12/14 | (2006.01) |
| H04L 12/741 | (2013.01) |

(52) U.S. Cl.
CPC .......... *H04L 12/1403* (2013.01); *H04L 12/14* (2013.01); *H04L 12/1435* (2013.01); *H04L 12/1471* (2013.01); *H04L 45/74* (2013.01)

(58) Field of Classification Search
None
See application file for complete search history.

(56) References Cited

U.S. PATENT DOCUMENTS

| 5,757,783 | A | 5/1998 | Eng et al. |
| 6,574,239 | B1 | 6/2003 | Dowling et al. |
| 6,714,962 | B1 | 3/2004 | Helland et al. |
| 6,731,625 | B1 | 5/2004 | Eastep et al. |
| 6,885,660 | B2 | 4/2005 | Inbar et al. |
| 7,173,933 | B1 | 2/2007 | O'Rourke et al. |
| 7,292,538 | B1 | 11/2007 | O'Rourke et al. |
| 7,308,266 | B2 | 12/2007 | Du et al. |
| 7,321,587 | B2 | 1/2008 | Gao et al. |

(Continued)

OTHER PUBLICATIONS

USPTO; Office Action dated Aug. 9, 2010 for U.S. Appl. No. 11/929,001, filed Oct. 30, 2007 in the name of Walter G. Dixon, 16 pages, Aug. 9, 2010.

*Primary Examiner* — Nicholas Sloms
(74) *Attorney, Agent, or Firm* — Baker Botts L.L.P.

(57) ABSTRACT

In one embodiment, a method includes receiving one or more packets of a communication session from one or more interfaces, such that the interface is a subscriber interface or a network interface. The method further includes associating the communication session to an end user with a source Internet Protocol (IP) address of the packet if the packet is received from the subscriber interface or to an end user with a destination IP address of the packet if the packet is received from the network interface.

17 Claims, 3 Drawing Sheets

(56) References Cited

U.S. PATENT DOCUMENTS

| | | |
|---|---|---|
| 7,710,872 B2 | 5/2010 | Vasseur |
| 7,924,854 B2 | 4/2011 | Dixon et al. |
| 2002/0021675 A1 | 2/2002 | Feldmann |
| 2002/0032766 A1* | 3/2002 | Xu .......................... H04L 29/06 709/223 |
| 2005/0002335 A1 | 1/2005 | Adamczyk et al. |
| 2005/0044138 A1* | 2/2005 | Albert .................... G06Q 30/02 709/203 |
| 2006/0045078 A1* | 3/2006 | Kathail ................ G06F 9/5044 370/360 |
| 2006/0101098 A1 | 5/2006 | Morgan et al. |
| 2006/0149845 A1 | 7/2006 | Malin et al. |
| 2006/0155756 A1* | 7/2006 | Stanev .............. G06F 17/30899 |
| 2007/0129076 A1 | 7/2007 | Cho et al. |
| 2007/0288593 A1 | 12/2007 | Wang |
| 2007/0291915 A1 | 12/2007 | Tseitlin et al. |
| 2008/0072280 A1 | 3/2008 | Tardo et al. |
| 2008/0285487 A1 | 11/2008 | Forslow et al. |
| 2009/0067437 A1* | 3/2009 | Krishnan ............ H04L 12/2898 370/395.53 |
| 2009/0109982 A1 | 4/2009 | Batz et al. |
| 2009/0109983 A1 | 4/2009 | Dixon et al. |

* cited by examiner

SYSTEM AND METHOD FOR ASSOCIATING AN END USER FOR BILLING IN A NETWORK ENVIRONMENT

RELATED APPLICATION

This application is a continuation, under 35 U.S.C. §120, of U.S. patent application Ser. No. 11/928,820, filed Oct. 30, 2007, and entitled "System and Method for Associating an End User for Billing in an Network Environment," which is incorporated herein by reference.

TECHNICAL FIELD

This disclosure relates in general to the field of communications and, more particularly, for associating an end user for billing in a network environment.

BACKGROUND

Data networking architectures have grown increasingly complex in communication systems and environments. Some network equipment may be used to bill end users for services during a transaction. When an end user communicates with a network server during the transaction, the end user generally incurs a charge associated with the use of network resources and/or the value of the content received from the network server.

As the subscriber base of end users increases and/or becomes mobile, efficient management of communication sessions and data flows becomes even more critical. Some network equipment may provide incorrect information or inaccurate data to associate the transaction with an end user. Thus, the ability to properly and quickly manage accurate information in a network environment presents a significant challenge to system designers and network operators.

DESCRIPTION OF EXAMPLE EMBODIMENTS

Overview

In one embodiment, a method includes receiving one or more packets of a communication session from one or more interfaces, such that the interface is a subscriber interface or a network interface. The method further includes associating the communication session to an end user with a source Internet Protocol (IP) address of the packet if the packet is received from the subscriber interface or to an end user with a destination IP address of the packet if the packet is received from the network interface.

In another embodiment, the method for associating an end user for billing in a network environment includes searching an end user database using the source IP address of the packet if the packet is received from the subscriber interface or the destination IP address of the packet if the packet is received from the network interface. The method also includes making a single query to an external database or known user table to properly identify the end user.

Important technical advantages of certain embodiments include supporting L3 switching architectures and virtual LAN interfaces multiplexed across one or more physical interface. This allows operator to configure virtual LAN as a subscriber virtual LAN or a network virtual LAN, such that a billing gateway can use this information to determine which IP address within a packet to use for subscriber identification.

Other important technical advantages of certain embodiments include not requiring a search of a second IP address within a packet if the first IP address search fails. Therefore, only a single query of external database is needed instead of two queries or serialized queries if neither IP address is in the subscriber database. This allows for quicker and more efficient processing of the packets since only one query is made.

Other technical advantages will be readily apparent to one skilled in the art from the following figures, descriptions, and claims. Moreover, while specific advantages have been enumerated above, various embodiments may include all, some, or none of the enumerated advantages.

Description

Figures 1A, 1B:
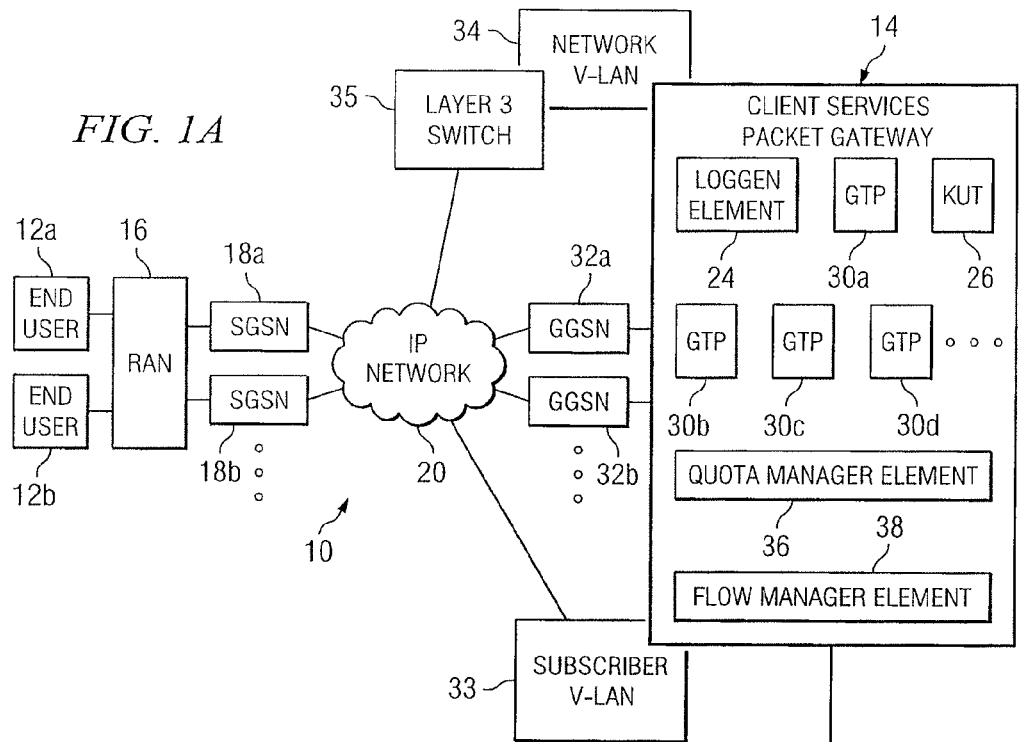
FIG. 1A illustrates an example system for associating an end user for billing.
FIG. 1B illustrates a simplified block diagram of a known user table (KUT) included within the system.

FIG. 1A is a simplified block diagram of a communication system 10 for associating an end user for billing and for billing end users in a client-server transaction in a network environment. Communication system 10 includes an end user 12a-b, a client services packet gateway 14, a radio access network (RAN) 16, multiple serving general packet radio service (GPRS) support node (SGSN) 18a and 18b, and an internet protocol (IP) network 20. Additionally, communication system 10 includes multiple gateway GPRS support nodes (GGSNs) 32a-b, a subscriber virtual LAN 33, a network virtual LAN 34, and a Layer 3 switch 35. Client services packet gateway 14 may include a loggen element 24, a known user table (KUT) 26, multiple GPRS tunneling protocol (GTP) communications protocol elements 30a-d that facilitate communications between client services packet gateway 14 and any billing entity within communication system 10, a quota manager element 36, and flow manager element 38. Communication system 10 may additionally include a billing system element 40 that may include a quota server and a billing mediation agent (BMA) 44. Billing system element 40 may also include a price server 50 and an advice of charge server 60.

FIG. 1A may be generally configured or arranged to represent a 2.5G communication architecture applicable to a Global System for Mobile (GSM) environment in accordance with a particular embodiment of the present disclosure. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that could benefit from a billing function being provided for any network element. This may be inclusive of first generation, 2G, and 3G architectures that provide features and services for any end user 12. Moreover, communication system 10 could be applied to any access network/protocol that allows end user 12 to create sub-connections, which specify differential treatment for packets in those connections. Furthermore, the relaying of such information into one or more client services packet gateway elements could be implemented in any such network/access technology.

According to the illustrated embodiment, system 10 provides services such as communication sessions to endpoints such as end user 20. A communication session refers to an active communication between endpoints. Information may be communicated during a communication session. Information may include voice, data, text, audio, video, multimedia, control, signaling, and/or other information. Information may be communicated in packets, each comprising a bundle of data organized in a specific way for transmission. Each session can have a session key. The session key can include TCP or UDP port information, IP protocol information, such as TCP or UDP, and virtual routing and forwarding (VRF) information.

In accordance with the teachings of the present disclosure, communication system 10 operates to efficiently and accurately associate an IP packet to a subscriber based on the IP address in the packet and the configuration of the ingress interface or virtual LAN. Client services packet gateway 14 may parse IP packets transmitted between a user and a server or between a user and another user (or any other suitable destination). Each packet arrives on a virtual LAN and each packet contains a source IP address and a destination IP address. Client services packet gateway 14 can quickly identify whether to use the source IP address or the destination IP address to associate with a subscriber to bill depending on which virtual LAN or interface the packet arrives from. If the packet is ingress from a subscriber virtual LAN or a subscriber interface, then client services packet gateway 14 will associate the subscriber with the source IP address of the packet. If the packet is ingress from a network virtual LAN or a network interface, then client services packet gateway 14 will associate the subscriber with the destination IP address of the packet. The IP address selected based on the interface or virtual LAN configuration can be used to determine an identity (or profile) of end user 12 that may be stored in end user database. For selected flows and for selected clients, billing system element 40 debits an end user account based on the type and quantity of information being transmitted. In a general sense, client services packet gateway 14 may cooperate with billing system element 40 in order to charge end user 12 based on a particular event, content, or communication flow.

Additionally, communication system 10 operates to accurately bill subscribers involved in a peer-to-peer transaction that share a single billing gateway. Client services packet gateway 14 can use peer-to-peer content rules to use next-hop, reverse next-hop, or internal client services packet gateway routing configurations for packets based on if the IP packet is received via a subscriber interface or a network interface. Client services packet gateway 14 can be configured with next-hop commands to forward a packet or packet flow involving a peer-to-peer transaction that is received from a subscriber virtual LAN or interface to a L3 switch or router. Alternatively, client services packet gateway 14 may be configured to internally forward a packet or a packet flow of a peer-to-peer transaction that is received from a subscriber virtual LAN or interface. Client services packet gateway 14 may create a session or flow associated with the source IP address of packet, such as end user 12a, if packet or packet flow is received via subscriber virtual LAN or interface. Normal network routing of the packet or packet flow is overridden by the next-hop configuration of forwarding the packet or packet flow to L3 switch or router. L3 switch or router can forward packet or packet flow back to client services packet gateway 14 on a virtual LAN configured as a network virtual LAN. Since packet or packet flow is received via a network virtual LAN or interface, client services packet gateway 14 may create a new session associated with the destination IP address of the packet, such as end user 12b. Normal network routing of the packet or packet flow continues since the packet or packet flow was received via a network virtual LAN or interface. At this point, client services packet gateway 14 has created two flows each associated with an end user, such that both end users are charged for the peer-to-peer transaction.

For purposes of teaching and discussion, it is useful to provide some overview as to the way in which the following disclosure operates. The following foundational information may be viewed as a basis from which the present disclosure may be properly explained. Such information is offered earnestly for purposes of explanation and discussion only and, accordingly, should not be construed in any way to limit the broad scope of the present disclosure and it potential applications.

Generally, a billing gateway provides charging services for subscriber transactions. When the subscriber communicates with a network server for the transaction, the subscriber incurs a charge associated with the use of network resources and/or the value of the retrieved content.

Normally, when a billing gateway processes IP packets, the billing gateway associates the IP packet with a subscriber to apply charging policies or other policies, such as QoS, to the IP packet. The billing gateway will associate an IP packet with a subscriber to charge who is in the billing gateway's table of subscribers. The billing gateway may use the source IP address or the destination IP address of the IP packet to search its subscriber table to bill the correct subscriber. The flow manager element, discussed below in more detail, uses a simple and fast algorithm to determine if the source IP address or destination IP address of the IP packet should be used for searching the subscriber table.

Referring back to FIG. 1, an end user [either 12a or 12b] is a client, customer, subscriber, entity, source, or object seeking to initiate network communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of packet, numeric, voice, video, audio-visual, or script data, or any type of source or object code, or any other suitable information in any appropriate format that may be communicated from one point to another.

RAN 16 is a communications interface between end user 12 and SGSNs 18a and 18b. RAN 16 may comprise a base transceiver station and a base station controller in one embodiment. The communications interface provided by RAN 16 offers connectivity and allows data to be exchanged between end user 12 and any number of selected elements within communication system 10. RAN 16 facilitates the delivery of a request packet generated by end user 12 and the reception of information sought by end user 12. RAN 16 is only one example of a communications interface between end user 12 and SGSNs 18a and 18b. Other types of communications interfaces may be used for a desired network design based on particular needs.

SGSNs 18a and 18b and GGSNs 32a and 32b are communication nodes or elements that cooperate in order to facilitate a communication session involving end user 12. GGSNs 32a-b are communications nodes operating in a GPRS environment that may be working in conjunction with multiple SGSNs 18a and 18b to provide a communications medium in a GPRS service network. GGSNs 32a and 32b may be inclusive of a walled garden (providing a security or an access functionality to communication system 10) or any other suitable mechanism that a network operator may choose to implement in providing some connectivity for a network. GPRS represents a packet-based data bearer service for communication services that may be delivered as a network overlay for any type of suitable network configuration or platform. GPRS may support multiple internet communication protocols and may enable existing IP, point to point protocol (PPP), or any other suitable applications or platforms to operate over a given network.

IP network 20 represents a series of points or nodes of interconnected communication paths for receiving and transmitting packets of information that propagate through communication system 10. IP network 20 offers a communicative interface between end user 12 and selected GGSNs 32a-b and may be any local area network (LAN), wireless local area network (WLAN), metropolitan area network (MAN), wide area network (WAN), virtual private network (VPN), or any other appropriate architecture or system that facilitates communications in a network environment. IP network 20 may implement a user datagram protocol (UDP)/internet protocol (UDP/IP) connection and use a transmission control protocol (TCP/IP) communication language protocol in particular embodiments of the present disclosure. However, IP network 20 may alternatively implement any other suitable communication protocol for transmitting and receiving data or information within communication system 10.

Subscriber virtual LAN (VLAN) 33 represents a VLAN configured by a network administrator or operator to be marked as a subscriber VLAN 33. Network VLAN 34 represents a VLAN configured by a network administrator or operator to be marked as a network VLAN 34. Generally, a VLAN 33, 34 consists of a network of computers that behave as if they were connected by the same wire. Both the subscriber VLAN 33 and network VLAN are connected to client services packet gateway 14 across the network. Client services packet gateway may have one or more virtual interfaces and potentially thousands of virtual interfaces to communicate with subscriber VLAN 33 and network VLAN 34. Alternatively, network administrator or operator can configure interfaces coupled to VLAN to be subscriber interface or network interface. Interface can be a physical or logical interface.

For purposes of example and explanation only, a VLAN may be a Layer-2 broadcast domain. In one particular embodiment, a mobile gateway, such as GGSN, may put the correct VLAN marking on a subscriber packet, such that subscriber packet will be on the correct VLAN. Mobile gateway may select that VLAN tag based on the next-hop for routing the packet. The selection of next-hop may be based solely on routing tables or the selection of next-hop may be based on information provided by the mobile device. For example, a packet traversing a Layer-3 switch before arriving at client services packet gateway may use routing tables to determine next-hop. The next-hop may reside on a VLAN so the VLAN would be determined by routing.

L3 switch 35 can represent a switch operable to receive a packet that is next-hop routed from client services packet gateway 14 and return the packet to client services packet gateway 14. The packet returned to client services packet gateway 14 will be via a network virtual LAN, such that a new flow is created. Alternatively L3 switch can be a router.

Client services packet gateway 14 represents a generic piece of network equipment that can facilitate some type of accounting service for communication system 10. Client services packet gateway 14 could be a wireless application protocol (WAP) gateway, a compression and/or optimization engine, a billing engine (inclusive of per-content billing), a service enforcement element, a content authorization component, a policy enforcement gateway, or any other element that is operable to modify, process, or transform data or information in a network environment. This may be inclusive of simple routers, switches, loadbalancers, gateways, bridges, or any other piece of network equipment where appropriate and based on particular needs. Client services packet gateway 14 represents any component, device, element, or object that can benefit from having suitable signaling information provided to it such that appropriate billing may be achieved.

As described above, client services packet gateway 14 utilizes the identity of the client or the end user to provide services based on a source profile. In a particular embodiment of the present disclosure, client services packet gateway 14 provides client-aware services by operating at networking layers two and three.

Accordingly, the information available at networking layers two and three provides a basis for the identification of an end user or a client. Client services packet gateway 14 may use an IP address or any other suitable parameter to uniquely identify a client or an end user in offering a service, enhanced capability, or feature to an end user. Client services packet gateway 14 may include any suitable hardware, software, components, or elements that identify a unique identifier in order to provide some networking feature or capability to an end user.

In operation of an example embodiment, client services packet gateway 14 can efficiently extract information from a packet or a packet flow to associate with end user. Each packet arrives on a VLAN and each packet contains a source IP address and a destination IP address. Client services packet gateway 14 can quickly identify whether to use the source IP address or the destination IP address depending on which VLAN or interface the packet arrives from. If the packet is ingress from a subscriber VLAN or a subscriber interface, then client services packet gateway 14 will associate the subscriber with the source IP address of the packet. If the packet is ingress from a network VLAN or a network interface, then client services packet gateway 14 will associate the subscriber with the destination IP address of the packet. The IP address selected based on the interface or VLAN configuration may be used to determine an identity (or profile) of end user 12 that may be stored in KUT 26. This operation removes ambiguous logic having to search a destination IP address to associate with an end user stored in KUT if a source IP address is not associated with an end user stored in KUT. Therefore, transactions, such as streaming data or FTP, are processed faster. Alternatively, client services packet gateway 14 may extract or identify any information within the data flow that provides a correlation between end user 12 and a given data flow. In another embodiment, client services packet gateway 14 may search an external subscriber database using source IP address if the packet is received on a subscribe interface or destination IP address if the packet is received on a network interface. By knowing which IP address to use based on the interface configuration, only one query to the external database is required.

In one particular embodiment, client services packet gateway 14 may have a multiprocessor architecture that associates each subscriber IP address to a particular processor. For example, data associated with subscriber 1, such as session object, user object, and prepaid billing information, can reside on a processor, and data associated with subscriber 2 can reside on a separate processor. Client services packet gateway can determine the processor that each received packet is forwarded to. If packet is received on a subscriber interface, then client services packet gateway will use the source IP address to determine what processor to forward the packet. If packet is received on a network interface, then client services packet gateway will use the network IP address to determine what processor to forward the packet. It is important that the packet goes to same processor each time because each processor knows information relating to the session or packet flow as well as the subscriber. This allows transactions to process faster because processors do not have to communicate with other processors to determine the user identity, how much quota user has remaining, the characteristics of the http session, etcetera.

Client services packet gateway 14 may also be a client-aware device that provides or offers some service or feature to end user 12. Such services may be based on an effective mapping between a source IP address or a destination IP address of a given address packet and a user profile or information associated with end user 12. Client services packet gateway 14 may include a RADIUS component that may receive RADIUS updates and parse the updates. In addition, client services packet gateway 14 may execute some action based on the RADIUS updates it receives. Client services packet gateway 14 may be provided with accounting, authorization and authentication (AAA) capabilities where appropriate. Alternatively, these capabilities may be provided external to client services packet gateway 14, for example, in an AAA server.

There are other reasons why a device or a component may seek to identify the source (end user 12) associated with a communication session or data flow. For example, some devices may wish to identify end user 12 for authorization purposes. In another example, a device may wish to maintain user profiles for billing or accounting records (for example, in conjunction with per-user accounting) or to provide for content billing information. Alternatively, a device or a component may use the identification of end user 12 to provide for any other type of suitable client-aware service, tool, or feature according to the particular needs of network operators. Additional services may be related to areas such as routing, permissions or access-granting mechanisms, priority, quality of service (QoS), firewalling, content filtering, or any other suitable parameters or policies where user-aware characteristics serve as a basis for a network service implementation.

In an example scenario, end user 12 may have a communication session established with SGSN 18a where a certain amount of money from an account of end user 12 is translated into a download of a given number of bytes. When end user 12 moves to SGSN 18b, end user 12 may be permitted to download a different number of designated bytes for the same amount of money or billing rate. The SGSN change may be detected by GGSN 32a or 32b whereby the selected GGSN communicates an accounting update to client services packet gateway 14. Client services packet gateway 14 may then return all downloaded quota for end user 12 and notify billing system element 40 of the change in SGSN. Client services packet gateway 14 may also communicate an acknowledgement to the selected GGSN for the message provided thereto. Client services packet gateway 14 may then download the appropriate quota information for end user 12 again. This information may be retrieved from quota server 42 or alternatively from any other suitable database or storage element provided within billing system element 40 or provided external thereto. Billing system element 40 may be aware of the location change and send quota information to client services packet gateway 14 based on new financial parameters or new tariff characteristics that apply to the new location or the change in network parameters.

Client services packet gateway 14 may be inserted into a data flow that may view, extract, identify, access, or otherwise monitor information included within the data flow. Client services packet gateway 14 may handle the enforcement of access, quota distribution, and accounting that is provided by the information retrieved from elements included within billing system element 40. Client services packet gateway 14 may generally deduct quota after it has been properly allocated and, subsequently, retrieve additional quota when that quota allocation has been consumed. In a general sense, client services packet gateway 14 may be responsible for quota enforcement for end user 12.

Loggen element 24 is a storage element operable to build billing records and communicate the billing records to BMA 44 based on information provided by KUT 26. Even in cases where the information returned by KUT 26 reflects a null (e.g., no active BMA), this may be communicated to GTP element 30a, which may use the value to determine the destination and queue(s) to use or to invoke for a corresponding billing record. Loggen element 24 may also operate to store data for later use and execute all formatting for billing records to be communicated to BMA 44. Loggen element 24 may be implemented using hardware, software, or any other suitable element or object operable to store information and to generate a billing record to be communicated to BMA 44. Loggen element 24 may communicate with BMA 44 in order to log quota usage data associated with end user 12. Loggen element 24 may generate logging records or billing records and additionally send messages to billing system element 40 associated with a change in SGSN.

KUT 26 is a data storage element that manages one or more correlations between the ID of end user 12 and a corresponding IP address. KUT 26 may also store information relating to BMA 44, previously designated to end user 12, and BMA 44 may be invoked when additional information associated with end user 12 is communicated to client services packet gateway 14. KUT 26 may be consulted as additional billing records are created in order to determine that BMA 44 should receive selected billing records. KUT 26 may also include an application program interface (API) that may be implemented in order to obtain user ID information for an IP address from a data flow.

Client services packet gateway 14 and billing system element 40 may implement any suitable communications protocol in order to exchange information. In an example embodiment, GTP elements 30a-d may be used as a communications protocol or platform for such communications. Alternatively, client services packet gateway 14 and billing system element 40 (or BMA 44) may implement any communications protocol or tunneling communication link in order to provide for a suitable data exchange. GTP elements 30a-d may be included in client services packet gateway 14 or provided external thereto and be GTP or non-GTP based where appropriate. In one embodiment, GTP elements 30a-d are software communication protocols that describe the acknowledgement (or ACKing) and handshaking operations that may allow recognition of active, operational, and disabled states associated with BMA 44. In addition, GTP elements 30a-d may facilitate the formatting, header information, sequencing, and other communication parameters in order to effectively deliver data or information between client services packet gateway 14 and BMA 44.

A billing record may then be created within client services packet gateway 14 and sent to BMA 44. A look-up operation may then be performed in order to correlate the IP address of end user 12 in KUT 26 to the user ID that may be included in that billing record. With this information provided, BMA 44 may now be assigned for this end user (if end user 12 is a new user). If this information or data flow is associated with an existing end user 12, it may be determined that BMA 44 was previously used by end user 12.

Quota manager element 36 is an element that manages quota information for services subscribed to by end user 12. Quota manager element 36 also provides an interface between GGSNs 32a and 32b and billing system element 40. Quota manager element 36 may also communicate with billing system element 40 in order to exchange information associated with charging for end user 12. Quota manager element 36 may also receive RADIUS updates from GGSN 32a or 32b that reflect the current status associated with end user 12.

Flow manager element 38 is an object that manages associating an end user to a packet or packet flow. Flow manager associates a packet or packet flow received via a subscriber VLAN or interface with an end user based on the packet's source IP address, and associates a packet or packet flow received via a network VLAN or interface with an end user based on the packet's destination IP address. In a peer-to-peer transaction, flow manager element can create separate session objects for each end user, such that a separate billing record is created for each session object. In one particular embodiment, flow manager element can force the creation of multiple end user sessions. For example, flow manager element 38 can use peer-to-peer content rules to use next-hop, reverse next-hop, or internal client services packet gateway 14 routing configurations for packets depending on if the IP packet is received via a subscriber interface or a network interface. In one particular embodiment, client services packet gateway 14 may be configured with next-hop commands to forward a packet or packet flow involving a peer-to-peer transaction that is received from a subscriber VLAN or interface to a L3 switch or router. In an alternative embodiment, client services packet gateway 14 may forward packet or packet flow internally from one processor to another, such that each processor is associated with a particular session or flow. The operations and processes associated with the elements included within flow manager element 38 are described below with reference to FIGS. 2A-2B.

It is critical to note that client services packet gateway 14 and flow manager element 38 may include any suitable elements, hardware, software, objects, or components capable of effectuating their operations or additional operations where appropriate. Additionally, any one or more of the elements included in client services packet gateway 14 and flow manager element 38 may be provided in an external structure or combined into a single module or device where appropriate. Moreover, any of the functions provided by these two elements may be offered in a single unit or single functionalities may be arbitrarily swapped between client services packet gateway 14 and flow manager element 38. The embodiment offered in FIG. 1A has been provided for purposes of example only. The arrangement of elements (and their associated operation(s)) may be reconfigured significantly in any other appropriate manner in accordance with the teachings of the present disclosure.

Billing system element 40 is an object that manages the billing and access policies associated with a given end user 12. In one embodiment, billing system element 40 includes quota server 42, BMA 44, price server 50, and advice of charge server 60. Client services packet gateway 14 may communicate with billing system element 40 in order to retrieve information or learn of billing policies for end user 12. FIG. 1B is a simplified block diagram of KUT 26 included within communication system 10. KUT 26 may operate to manage or correlate user ID information with IP address data from a given communication or data flow. A number of entries may be included within KUT 26 that execute this correlation. For example, an entry may be provided as key address '1.1.1.1' with a data field in a first segment that defines BMA 44 (data field #1) and a data field in a second segment that identifies a user ID for that IP address as some person or entity (data field #2). This is illustrated by the 'John Smith' entry in FIG. 2.

KUT 26 may also identify or store current SGSN information (data field #3) for end user 12 in a third segment. KUT 26 may receive RADIUS updates and maintain an end user's IP address and new SGSN that is being used. KUT 26 may be accessed in order to indicate that end user has an IP address of 1.1.1.1. Such an address may correspond to 'John Smith' and an identifier of SGSN #1 (e.g. its IP address) or that 'John Smith' is now engaging SGSN #2 (reflected by its identifier, e.g. its IP address). KUT 26 has the capability of recognizing old and new SGSNs and may further add a capability to recognize changes therewith.

In operation, KUT 26 may return a given BMA 44 to use as the destination for all billing records for a particular session, data flow, or end user 12 in accordance with one or more of the following example guidelines. If an element with an already known user ID exists in KUT 26 and corresponds to any requested IP address, the identification (IP address) of the selected BMA 44 may be forwarded from KUT 26 to the caller entity. Where requested elements with user IDs exist, the selected BMA 44 for a first IP request may be returned.

If neither IP address has a corresponding element in KUT 26, KUT 26 may notify loggen element 24 that no user ID is present in the table. When loggen element 24 determines that no user ID information will be obtained, it may communicate with KUT 26 and deliver source and destination IP addresses in order to assign BMA 44. KUT 26 may also operate to accurately recall the IP address associated with an identification correlating to end user 12. In an example scenario, client services packet gateway 14 may not know the identity of end user 12 and therefore an IP source address or some other user-identifying data is needed. The IP address may be dynamically assigned when an associated device is activated, e.g., a cellular telephone is turned on. The IP address may be assigned by any suitable element such as GGSN 32a or 32b, for example. Alternatively, an IP source address may be assigned or designated in any other suitable manner. KUT 26 may now be implemented to retrieve the user ID name associated with the IP address correlating to end user 12. This information may be positioned in a billing record that may be used to create a bill for a given end user 12. This may also be used (for example) to track information such as how many bytes were uploaded by end user 12 (byte counts) or how many URL addresses were accessed (or which URL addresses were accessed) by a given end user 12.

KUT 26 is thus provided with the capability of mapping the source IP address (or any other end user 12 parameter) to a user ID. The user ID may be obtained from an external database where appropriate or any other suitable location. Alternatively, the user ID may be extracted from a RADIUS flow, a terminal access controller access control system (TACACS) communications flow, a diameter communications flow, or any other suitable communications protocol flow, communication session, or data exchange. The database may be populated at any suitable time and updated using any suitable mechanism, such as via the sniffing of RADIUS or TACACS flows.

Figure 2A:
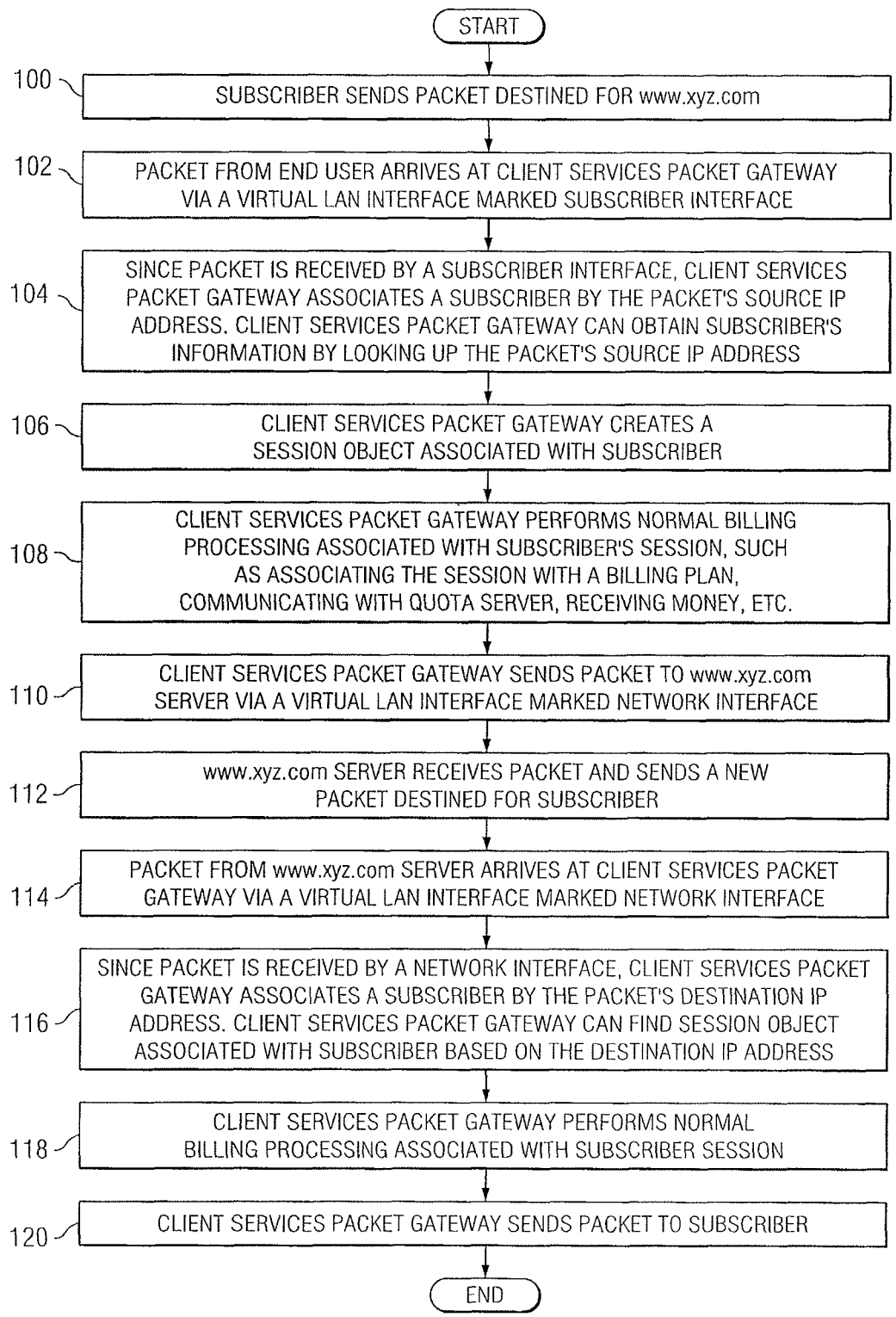
FIG. 2A illustrates an example method for associating an end user for billing.

FIG. 2A is a simplified flowchart illustrating an example method for associating an end user for billing. The flowchart may begin at step 100 where end user or subscriber sends packet or packet flow destined for www.xyz.com. At step 102, packet or packet flow arrives at client services packet gateway 14 via a virtual LAN or interface that has been configured as a subscriber VLAN or a subscriber interface. At step 104, client services packet gateway associates a subscriber with the packet or packet flow based on how the VLAN or interface is configured. Since packet or packet flow is received via a subscriber VLAN or interface, then client services packet gateway 14 associates subscriber with the source IP address of the packet. Client services packet gateway 14 may obtain subscriber's information by looking up the packet's source IP address in KUT table or an external database.

At step 106, client services packet gateway creates a session object associated with subscriber. At step 108, client services packet gateway performs normal billing processing associated with subscriber's session, such as associating the session with a billing plan, communicating with quota server, receiving quota, etcetera. At step 110, client services packet gateway forwards packet or packet flow to www.xyz.com server via a VLAN or interface configured as a network VLAN or a network interface. At step 112, www.xyz.com server receives the packet or packet flow and sends a new packet or packet flow destined for subscriber.

At step 114, packet or packet flow from www.xyz.com arrives at client services packet gateway via network VLAN or network interface. At step 116, since packet or packet flow is received via a network VLAN or interface, then client services packet gateway associates subscriber with the destination IP address of the packet. Client services packet gateway may associate the packet or packet flow with subscriber's current session by the packet's destination IP address. At step 118, client services packet gateway performs normal billing processing associated with subscriber's session. At step 120, client services packet gateway forwards packet or packet flow from www.xyz.com to subscriber.

Figure 2B:
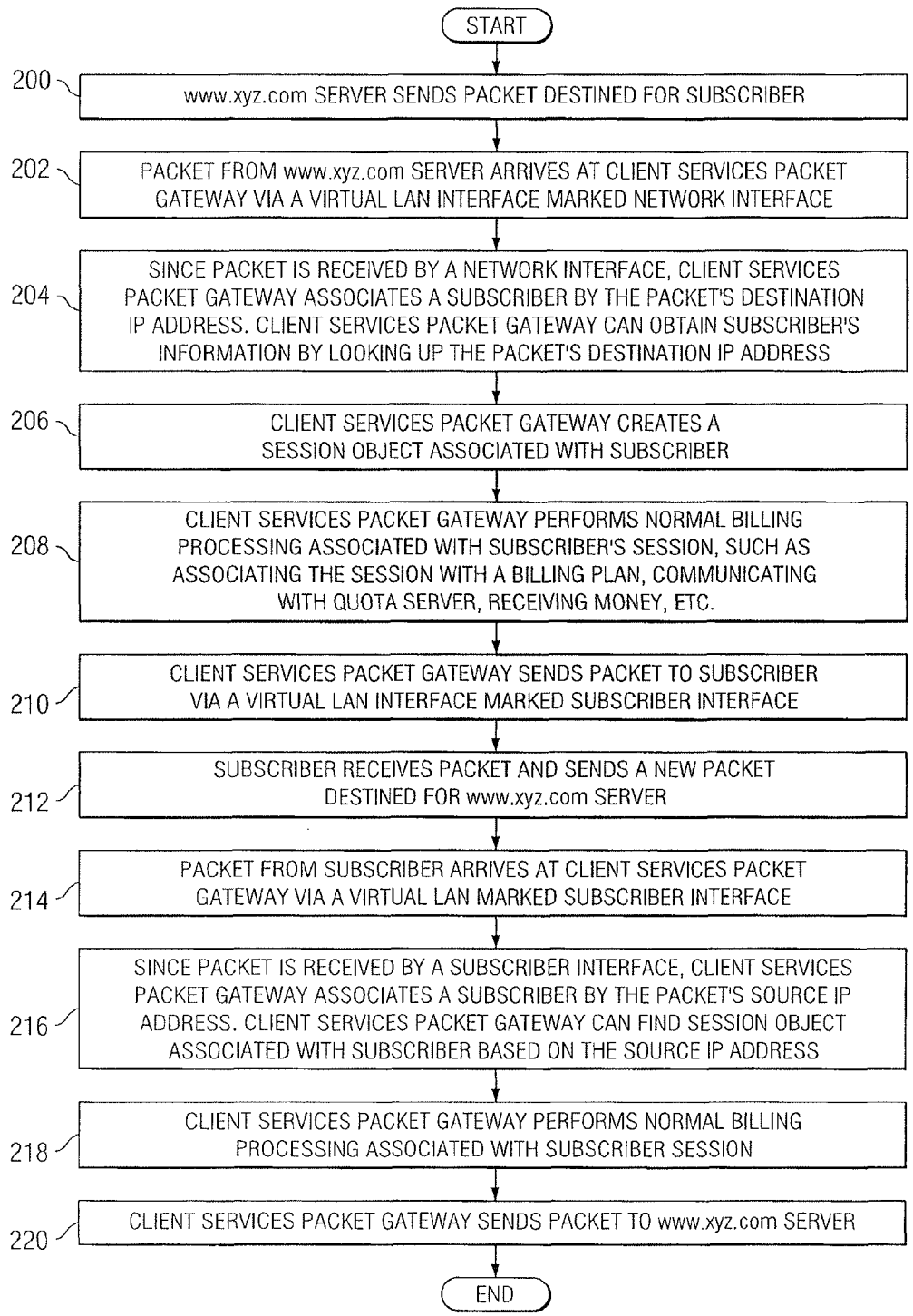
FIG. 2B illustrates another example method for associating an end user for billing.

FIG. 2B is another simplified flowchart illustrating an example method for associating an end user for billing. The flowchart may begin at step 200 where www.xyz.com server sends packet or packet flow destined for subscriber or end user. At step 202, packet or packet flow arrives at client services packet gateway via a virtual LAN or interface that has been configured as a network VLAN or a network interface. At step 204, client services packet gateway associates a subscriber with the packet or packet flow based on how the VLAN or interface is configured. Since packet or packet flow is received via a network VLAN or interface, then client services packet gateway associates subscriber with the destination IP address of the packet. Client services packet gateway can obtain subscriber's information by looking up the packet's destination IP address in KUT table or an external database.

At step 206, client services packet gateway creates a session object associated with subscriber. At step 208, client services packet gateway performs normal billing processing associated with subscriber's session, such as associating the session with a billing plan, communicating with quota server, receiving quota, etcetera. At step 210, client services packet gateway forwards packet or packet flow to subscriber via a VLAN or interface configured as a subscriber VLAN or a subscriber interface. At step 212, subscriber receives the packet or packet flow and sends a new packet or packet flow destined for www.xyz.com server.

At step 214, packet or packet flow from subscriber arrives at client services packet gateway via subscriber VLAN or subscriber interface. At step 216, since packet or packet flow is received via a subscriber VLAN or interface, then client services packet gateway associates subscriber with the source IP address of the packet. Client services packet gateway can associate the packet or packet flow with subscriber's current session by the packet's source IP address. At step 218, client services packet gateway performs normal billing processing associated with subscriber's session. At step 220, client services packet gateway forwards packet or packet flow from subscriber to www.xyz.com server.

Some of the steps illustrated in FIGS. 2A-B may be changed or deleted where appropriate and additional steps may also be added to the flowcharts. These changes may be based on specific communication architectures or particular interfacing arrangements and configurations of associated elements and do not depart from the scope or the teachings of the present disclosure. The interactions and operations of the elements within billing system element 40 and client services packet gateway 14, as disclosed in FIGS. 2A-B, have provided merely one example for their potential applications. Numerous other applications may be equally beneficial and selected based on particular networking needs.

Although the present disclosure has been described in detail with reference to particular embodiments, communication system 10 may be extended to any scenario in which end user 12 is provided with a service in the context of a wired or a wireless connection or coupling. This may also be extended to any other network architectures and include communications with some type of access server (e.g. a network access server (NAS), foreign agents, etc.). End user 12 may use a dedicated connection of some form or use forms of multiple access protocols where appropriate. Access may be associated with a PPP architecture or alternatively with layer three protocols over a layer two in accordance with particular needs. Moreover, significant flexibility is provided by communication system 10 in that any suitable one or more components may be replaced with other components that facilitate their operations. For example, RAN 16 and SGSNs 18*a* and 18*b* may be replaced by an access network or by a packet data serving node (PDSN). Additionally, GGSNs 32*a* and 32*b* may be replaced by a home agent or a NAS where appropriate.

Additionally, although communication system 10 has been described with reference to a number of elements included within client services packet gateway 14 and billing system element 40, these elements may be rearranged or positioned anywhere within communication system 10. In addition, these elements may be provided as separate external components to communication system where appropriate. The present disclosure contemplates great flexibility in the arrangement of these elements as well as their internal components. For example, in an alternative embodiment client services packet gateway 14 may include billing system element 40 or BMA 44 or these elements may be provided in a single module. Moreover, although FIGS. 1 and 2 illustrate an arrangement of selected elements, such as client services packet gateway 14 inclusive of quota manager element 36, loggen element 24, or GTP elements 30a-d, numerous other components may be used in combination with these elements or substituted for these elements without departing from the teachings of the present disclosure. Additionally, client services packet gateway 14 may be positioned in any suitable point of a data flow such that it may extract information used for generating a billing record.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus, comprising:
  a plurality of processors;
  a flow manager element communicatively coupled to the plurality of processors and operable to:
    receive a first packet of a communication session from one or more interfaces, the first packet being part of a peer-to-peer transaction between a first end user and a second end user;
    determine whether the first packet is received from a subscriber interface or a network interface;
    associate the communication session to the first end user with a source Internet Protocol (IP) address of the packet when the packet is received from the subscriber interface;
    determine a processor from the plurality of processors to forward the received first packet of the communication session based on the associated source IP address;
    receive the first packet of the communication session from a network virtual LAN, the first packet being forwarded from a router;
    in response to receiving the first packet from the network virtual LAN, associate the communication session to the second end user with a destination IP address;
    obtain subscriber information of the first end user and the second end user by searching an external database using the associated source IP address or associated destination IP address;
    create a first session object associated with the subscriber information of the first end user, wherein the first session object associated with the subscriber information of the first end user resides on the determined processor;
    associate the subscriber information of the first end user with the determined processor;
    create a second session object associated with the subscriber information of the second end user;
    process billing associated with the first session object and the second session object; and
    forward the received first packet of the communication session to the detelmined processor.

2. The apparatus of claim 1, wherein the flow manager element further operable to determine a routing configuration to forward the received first packet based on whether the first packet is received from the subscriber interface or the network interface.

3. The apparatus of claim 1, wherein processing billing associated with the first session object and second session object further comprises:
  determining type and quantity of received information associated with the received first packet; and
  processing billing according to the determined type and quantity of received information associated with the received first packet.

4. The apparatus of claim 1, wherein obtaining subscriber information by searching an external database further comprises making a single query to the external database to identify the subscriber information.

5. The apparatus of claim 4, wherein the external database is a known user table included in a client services packet gateway, the known user table operable to store an IP address associated with the first end user.

6. The apparatus of claim 1, wherein the subscriber interface communicates with a first virtual LAN configured as a subscriber virtual LAN and the network interface communicates with a second virtual LAN configured as a network virtual LAN.

7. A method, comprising:
  receiving a first packet of a communication session from one or more interfaces, the first packet being part of a peer-to-peer transaction between a first end user and a second end user;
  determining whether the first packet is received from a subscriber interface or a network interface;
  associating the communication session to the first end user with a source Internet Protocol (IP) address of the packet when the packet is received from the subscriber interface;
  determining a processor from a plurality of processors to forward the received first packet of the communication session based on the associated source IP address;
  receiving the first packet of the communication session from a network virtual LAN, the first packet being forwarded from a router;
  in response to receiving the first packet from the network virtual LAN, associating the communication session to the second end user with a destination IP address;
  obtaining subscriber information of the first end user and the second end user by searching an external database using the associated source IP address or associated destination IP address;
  creating a first session object associated with the subscriber information of the first end user, wherein the first session object associated with the subscriber information of the first end user resides on the determined processor;
  associating the subscriber information of the first end user with the determined processor;
  creating a second session object associated with the subscriber information of the second end user;
  processing billing associated with the first session object and the second session object; and
  forwarding the received first packet of the communication session to the determined processor.

8. The method of claim 7 further comprises determining a routing configuration to forward the received first packet based on whether the first packet is received from the subscriber interface or the network interface.

9. The method of claim 7, wherein processing billing associated with the first session object and second session object further comprises:
- determining type and quantity of received information associated with the received first packet; and
- processing billing according to the determined type and quantity of received information associated with the received first packet.

10. The method of claim 7, wherein obtaining subscriber information by searching an external database further comprises making a single query to the external database to identify the subscriber information.

11. The method of claim 10, wherein:
the external database is a known user table included in a client services packet gateway, the known user table operable to store an IP address associated with the first end user.

12. The method of claim 7, wherein the subscriber interface communicates with a first virtual LAN configured as a subscriber virtual LAN and the network interface communicates with a second virtual LAN configured as a network virtual LAN.

13. A non-transitory computer-readable storage medium encoded with computer-executable instructions, the computer-executable instructions, when executed, operable to cause one or more processors to:
- receive a first packet of a communication session from one or more interfaces, the first packet being part of a peer-to-peer transaction between a first end user and a second end user;
- determine whether the first packet is received from a subscriber interface or a network interface;
- associate the communication session to the first end user with a source Internet Protocol (IP) address of the packet when the packet is received from the subscriber interface;
- determine a processor from a plurality of processors in a client service packet gateway to forward the received first packet of the communication session based on the associated source IP address;
- receive the first packet of the communication session from a network virtual LAN, the first packet being forwarded from a router;
- in response to receiving the first packet from the network virtual LAN, associate the communication session to the second end user with a destination IP address;
- obtain subscriber information of the first end user and the second end user by searching an external database using the associated source IP address or associated destination IP address;
- create a first session object associated with the subscriber information of the first end user, wherein the first session object associated with the subscriber information of the first end user resides on the determined processor;
- associate the subscriber information of the first end user with the determined processor;
- create a second session object associated with the subscriber information of the second end user;
- process billing associated with the first session object and the second session object; and
- forward the received first packet of the communication session to the determined processor.

14. The non-transitory computer-readable storage medium of claim 13, wherein the computer-executable instructions further operable to cause one or more processors to determine a routing configuration to forward the received first packet based on whether the first packet is received from the subscriber interface or the network interface.

15. The non-transitory computer-readable storage medium of claim 13, wherein processing billing associated with the first session object and second session object further comprises:
- determining type and quantity of received information associated with the received first packet; and
- processing billing according to the determined type and quantity of received information associated with the received first packet.

16. The non-transitory computer-readable storage medium of claim 13, wherein obtaining subscriber information by searching an external database further comprises making a single query to the external database to identify the subscriber information.

17. The non-transitory computer-readable storage medium of claim 16, wherein the external database is a known user table included in a client services packet gateway, the known user table operable to store an IP address associated with the first end user.

* * * * *